May 29, 1951 F. L. McLAUGHLIN ET AL 2,555,093
INTERLOCKING NUT
Filed Jan. 6, 1947
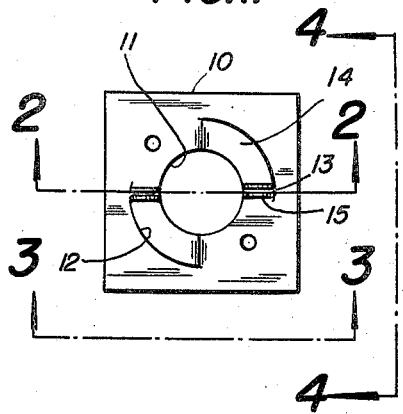
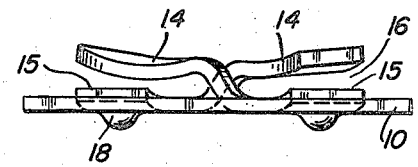
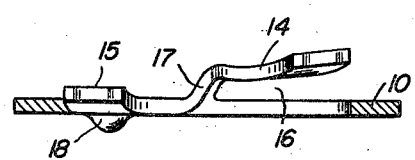
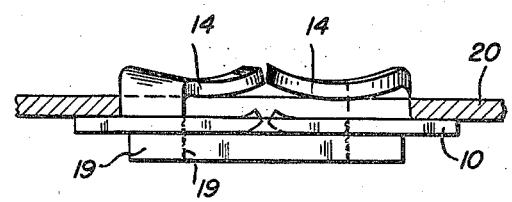
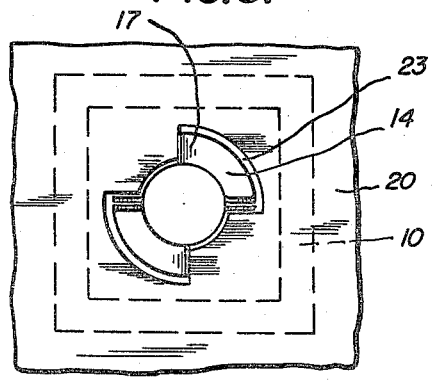
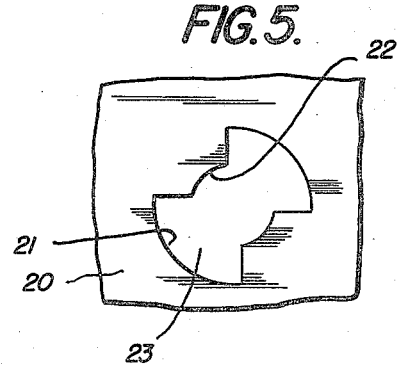
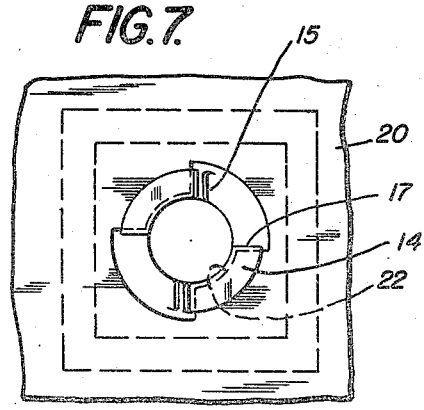
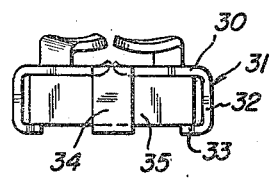
INVENTORS.
FRANK L. McLAUGHLIN.
BERNHARD F. KIESEL.
BY
Whittemore, Hulbert
& Belknap ATTORNEYS.

Patented May 29, 1951

2,555,093

UNITED STATES PATENT OFFICE 2,555,093

INTERLOCKING NUT

Frank L. McLaughlin and Bernhard F. Kiesel, Detroit, Mich.

Application January 6, 1947, Serial No. 720,444

5 Claims. (Cl. 151—33)

The present invention relates to an interlocking nut and more particularly to a nut provided with or secured to a metal plate constructed and arranged to cooperate with an opening formed in a panel or the like for effecting preliminary attachment of the nut to the panel prior to completion of assembly of the panel to a second part by means of a bolt threaded to the nut.

In the large scale assembly of articles such for example as automobile bodies, it is desirable to provide means for effecting a preliminary attachment of a nut to an apertured panel so that the nut will be held in juxtaposition adjacent an opening in the panel for the reception of a bolt. Many times it is desired to bolt a panel to another part during the assembly of an article at a time when access may not be had to both sides of the panel. Accordingly, the nut is attached to the panel as for example at what is the inside of an assembled article and is held there by means which preferably permit slight relative movement between the nut and the panel but which serve to prevent turning of the nut. Subsequently the article to be bolted to the panel is brought into proper position and the bolt is passed through an opening in the panel into the nut and is threaded therein. It sometimes happens that the bolt receiving hole in the article to be attached to the panel does not register precisely with the bolt receiving hole in the panel, and accordingly the slight relative movement which is permitted the nut allows the nut to be lined up with the bolt receiving hole in the article.

In accordance with the present invention the nut has associated therewith a plate which is constructed and arranged to interlock with the panel in a manner to permit slight relative movement of the plate relative to the panel after it is interlocked therewith. Means are provided which prevent separation between the plate and the panel after initial engagement. The plate referred to may be rigidly and permanently secured to a nut, as for example by projection welding, staking or the like. If preferred, the plate may form the bottom wall of a cage which has side walls and portions overlying the top of the nut so as to prevent removal of the nut from the cage. The cage of course surrounds the nut in a manner to prevent relative turning, so that after the cage has been interlocked with the panel the nut is held against turning as the bolt is threaded home.

In large scale assembly of articles, it is customary for the bolt to be threaded into the nut by means of a power tool and in high production work the operation is carried out very rapidly. It sometimes happens that the bolt is started in the nut with the threads crossed, and due to the use of the power tool the bolt may be rather tightly wedged in the nut. According to the present invention, means are provided which prevent rotation of the nut supporting plate in either direction after it has once been assembled with the panel. Accordingly, under these circumstances the cross threaded bolt may be rotated in a direction to release it from the nut without at the same time releasing the nut supporting plate from the panel.

In many cases, at the time the bolt is threaded home the nut is supported inside of a partial assembly and if its support is such that it may be released by reverse rotation of the bolt, the nut merely drops off inside the article and it is impossible without complete disassembly of the structure to provide a second nut for the reception of a bolt at the particular bolt receiving opening.

The present construction is also highly useful in the case where the sub-assemblies are produced at one location and are shipped to another location. The nut supporting plate is interlocked with the panel in a permanent manner so that vibration or jars in shipment will be ineffective to dislodge the nut from its operative position.

With the foregoing general remarks in mind, it is an object of the present invention to provide a nut supporting plate characterized by its simplicity and economy of manufacture.

It is a further object of the present invention to provide a nut supporting plate which may be attached by hand to an aperture in a panel and which after such attachment is permanently interlocked therewith.

It is a further object of the present invention to provide a nut supporting plate which has an interlock with an aperture in a panel which prevents separation of the plate from the panel even though reverse rotation is imparted to a jammed bolt in the nut.

More specifically, it is a feature of the present invention to provide a nut supporting plate adapted to support a nut adjacent a bolt receiving opening in a panel, which opening is provided with a plurality of inwardly projecting ears, which comprises a like plurality of arcuate arms arranged at the side of a bolt receiving opening and a like plurality of reverse stops projecting outwardly from the plate.

Other objects and features of the invention will become apparent as the description proceeds, especially when taken in conjunction with the accompanying drawings, wherein:

Figure 1 is a plan view of a nut supporting plate;

Figure 2 is a section on the line 2—2 on a greatly enlarged scale;

Figure 3 is a front elevation of the plate shown in Figure 1 on a greatly enlarged scale;

Figure 4 is a side elevation of the plate shown in Figure 1 on a greatly enlarged scale illustrating the nut secured to the nut supporting plate;

Figure 5 is a fragmentary view of the panel to which the nut supporting plate is attached;

Figure 6 is a bottom plan view of a nut supporting plate assembled with the panel prior to its rotation into locking position;

Figure 7 is a view similar to Figure 6 showing the nut supporting plate rotated into interlocked position; and Figure 8 is a side elevation of a nut supporting plate which forms the bottom wall of a nut retaining cage.

The present invention concerns itself primarily with a nut supporting plate which may be secured to a nut as by projection welding or the like or which may form the bottom wall of a nut retaining cage. In Figures 1 to 3 and 5 to 7 the plate is shown independently of the nut or cage for clarity. In Figure 4, however, the plate is illustrated as attached to a nut and in Figure 8 the plate is illustrated as forming the bottom wall of a nut supporting cage.

The nut supporting plate 10 is illustrated as of square configuration and it is preferably formed of relatively thin cold rolled steel. The material is not a spring material but it has a certain amount of resilience, of which use is made in effecting the permanent interlock as will subsequently be described. As best seen in Figure 1, the plate is provided with a central circular bolt receiving opening 11. In addition it is provided with two arcuate cuts 12 which are concentric with the opening 11. Close to but spaced slightly from the ends of the arcuate cuts 12 are transverse cuts 13. It will be appreciated that the cuts 12 and 13 referred to define arcuate arms or tongues 14 and short tabs or tangs 15.

The arcuate arms 14 are bent outwardly from the plane of the plate 10 so as to leave a space 16 between the adjacent surface of the plate 10 and the under surface of the arms 14. The arms 14 remain attached to the main portion of the plate 10 by substantially upstanding stop shoulders 17 which extend abruptly outwardly from said plate and whose purpose will subsequently be described. As seen in Figures 3, 4 and 5, the free ends of the arms 14 are preferably curved outwardly away from the plane of the body portion of the plate 10 for the reception of inwardly projecting ears formed on the panel.

The short tabs 15 are also bent outwardly from the plane of the body portion of the plate 10. The tabs 15, however, are relatively short and extend outwardly only far enough to have a substantial portion in the space 16 which lies between the adjacent surfaces of the plate 10 and the arms 14. The tabs 15 serve as reverse stops, as will subsequently be described.

Referring now to Figure 5, there is illustrated a fragment of a panel 20 to which the nut supporting plate 10 is to be attached. The panel 20 is provided with an opening 21 which is of circular shape except for a plurality of inwardly projecting ears 22. The construction described leaves relatively large arcuate spaces 23 between the inwardly projecting ears 22. In the illustrated embodiment the aperture 21 is provided with two opposed ears 22 and it is found that this number is sufficient. In fact, certain advantages result from the use of two ears and two of the arms 14 rather than an increased number, although three or more may be employed if desired and still retain some of the advantages of the present invention.

In Figures 1 to 3 the plate 10 is illustrated as provided with rounded projections 18 which are employed to effect a projection weld with an end of a nut such as the nut 19 illustrated in Figure 4. The nut 19 may be a conventional square nut provided with an interiorly threaded bolt receiving opening 19a.

Referring now to Figure 6, there is shown a portion of the panel 20 with the arcuate arms 14 as occupying the enlarged spaces 23 of the bolt receiving opening 21 in the panel. It will be appreciated that since the stop shoulders 17 of the arms cause the arms to project beyond the plane of the plate 10 for a substantial distance, and since the outer ends of the arms 14 are outwardly curved, the ends of the arms 14 are positioned at the opposite side of the panel 20 from the plate 10.

In Figure 7 the parts illustrated in Figure 6 are shown as in interlocked position which results from a rotation of the plate 10 through 90° in a clockwise direction. At this time it will be observed that the arms 14 have now moved to a position overlying the inwardly projecting ears 22 of the panel 20 and the stop shoulders 17 of the arms have been brought into engagement with side edges of the ears 22. At this time the short upwardly extending reverse stops 15 have passed completely underneath the ears 22 and are in a position to engage the other side edge of the ears 22 as reverse rotation is attempted.

The spacing between the under surface of the arms 14 and the top corner of the reverse stops 15 is somewhat less than the thickness of the panel section to which the plate is to be attached. Accordingly, as the clockwise rotation of the plate takes place there will be a certain amount of separation caused by the passage of the ears 22 between the under surface of the arms 14 and the top edge of the reverse stops 15. However, as soon as the upwardly displaced end of the reverse stop 15 has passed beyond the edge of the ear 22 the parts are permitted to move relatively toward each other sufficiently so as to insure that reverse rotation of the nut supporting plate is effectively prevented.

In designing a nut supporting plate the arcuate cuts 12 which define the positions of the arcuate arms 14 are preferably made on a substantially smaller radius than the radius of the opening 21 formed in the panel. At the same time the circumferential spacing between a stop shoulder 17 and the reverse stop 15 associated therewith is made substantially greater than the like circumferential dimension of the inwardly projecting ears 22 of the panel. As a result of this arrangement the plate 10 has a substantial movement relative to the panel in any direction parallel to the panel. In most cases this provision of relative movement between the nut and the opening in the panel is preferred, but in some cases it is not desired. In the event that such relative movement is not desired, of course the plate 10 is designed so that the stop shoulders 17 are spaced apart so that their outer edges are substantially tangent to the inner surface of the opening 21.

Referring now to Figure 8, there is illustrated a plate 30 which is in all respects identical with the plate illustrated in Figures 1 to 7 except that it forms the bottom wall of the cage generally indicated at 31 having side walls 32 which are bent over to provide top retaining portions 33. In addition, at the ends of the plate 30 portions 34 are bent upwardly so as to prevent longitudinal movement of the nut out of the cage. It will thus be seen that the cage 31 is adapted to retain a nut 35 therein and as illustrated in this figure the nut 35 has a slight motion relative to the cage 31 in any direction parallel to the plate 20.

As previously stated, the material from which the plate and/or the cage is constructed is preferably relatively thin gauge, cold rolled steel. This material imparts sufficient resilience to arms 14 and reverse stops 15 so as to insure a firm interlock which will not become accidentally disengaged during vibration or jars in transit and which acts to prevent rotation of the nut carried by the plate even though a substantial reverse turning force is imparted thereto as would be the case in attempting to release a cross threaded bolt from the nut.

Referring to Figure 4, it will be observed that the plate 10 lies in surface to surface contact against the panel 20. When the bolt is threaded into the nut 19 from the upper side of the structure as illustrated in Figure 4, it draws the nut 19 and accordingly the plate 10 firmly against the under side of the panel 20 so as to form a tight closure for the opening provided in the panel 20. This is an important feature of the present invention, since the assembly thus provides a substantially tight seal for each of the bolt receiving openings formed in the panel.

It will thus be seen that there is provided a device for attaching nuts to apertures in panels which is simple and economical to manufacture and which is very simple to apply. It may be applied by hand and rotated through 90° by a simple turn, in which position a substantially permanent interlock is effected.

While there is illustrated and described a single preferred form of plate, which, however, is illustrated as attached directly to a nut or as forming the bottom of a nut receiving cage, alternatively it will be appreciated that this full and explicit illustration and description has been made merely to enable those skilled in the art to practice the invention, the scope of which is indicated by the appended claims.

What we claim as our invention is:

1. Nut mounting means comprising a flat metal plate having a circular opening therethrough, the material of said plate being severed in a plurality of arcuate cuts concentric with the opening and each of said arcuate cuts connected by a substantially radial cut extending into said opening, said radial cuts being located adjacent the corresponding ends of said arcuate cuts, the material defined by the major portion of said arcuate cuts and said radial cuts constituting arcuate attaching arms, and the material defined by the minor portion of said arcuate cuts and said radial cuts constituting reverse stop abutments, each of said attaching arms having a portion at its attached end extending abruptly out of the plane of said plate, the remainder of said arm extending generally parallel to the plane of said plate, said abutments extending outwardly of said plate at the same side thereof as said arms, and terminating in the space between said plate and the portions of said arms generally parallel thereto.

2. Structure as defined in claim 1 in which said attaching arms are curved to cause the free ends of said arms to extend slightly upwardly.

3. Structure as defined in claim 1 comprising in combination a threaded nut secured to said plate with its threaded opening aligned with the circular opening in said plate.

4. Structure as defined in claim 3 in which said plate forms part of a cage structure surrounding said nut.

5. Structure as defined in claim 3 in which said plate is welded to the flat end surface of a nut.

FRANK L. McLAUGHLIN.
BERNHARD F. KIESEL.

REFERENCES CITED

The following references are of record in the file of this patent:

UNITED STATES PATENTS

| Number | Name | Date |
|---|---|---|
| 1,197,470 | Feldman | Sept. 5, 1916 |
| 1,581,559 | Williams | Apr. 20, 1926 |
| 1,786,722 | Reid | Dec. 30, 1930 |
| 1,818,581 | Reid | Aug. 11, 1931 |
| 2,115,312 | Lombard | Apr. 26, 1938 |
| 2,230,355 | Kost | Feb. 4, 1941 |
| 2,233,242 | Burke | Feb. 25, 1941 |
| 2,282,360 | Horrocks | May 12, 1942 |
| 2,315,210 | Kost | Mar. 30, 1943 |